(12) United States Patent
Hasebe et al.

(10) Patent No.: US 11,760,904 B2
(45) Date of Patent: Sep. 19, 2023

(54) ADHESIVE TAPE

(71) Applicant: DIC Corporation, Tokyo (JP)

(72) Inventors: Mai Hasebe, Saitama (JP); Hideaki Takei, Saitama (JP); Yusuke Takahashi, Tokyo (JP); Yukie Uemura, Osaka (JP); Kumiko Karasawa, Osaka (JP)

(73) Assignee: DIC Corporation, Tokyo (JP)

( * ) Notice: Subject to any disclaimer, the term of this patent is extended or adjusted under 35 U.S.C. 154(b) by 0 days.

(21) Appl. No.: 18/157,223

(22) Filed: Jan. 20, 2023

(65) Prior Publication Data
US 2023/0235195 A1   Jul. 27, 2023

(30) Foreign Application Priority Data

Jan. 27, 2022   (JP) .................................. 2022-010801

(51) Int. Cl.
*C09J 7/10*      (2018.01)
*C09J 175/08*    (2006.01)
*C09J 7/38*      (2018.01)

(52) U.S. Cl.
CPC . *C09J 7/10* (2018.01); *C09J 7/38* (2018.01); *C09J 175/08* (2013.01); *C09J 2475/00* (2013.01)

(58) Field of Classification Search
CPC ..... C09J 7/10; C09J 7/38; C09J 175/08; C09J 2475/00
See application file for complete search history.

(56) References Cited

FOREIGN PATENT DOCUMENTS

JP   2013-216875 A   10/2013

*Primary Examiner* — Rabon A Sergent
(74) *Attorney, Agent, or Firm* — Osha Bergman Watanabe & Burton LLP

(57) ABSTRACT

An adhesive tape including an adhesive layer is provided. The adhesive layer has a biobased content of 50% or more by mass. The adhesive layer contains a reaction product of a urethane resin (A) and a cross-linking agent (B). The urethane resin (A) contains at least a structural unit derived from a biobased polyether polyol and a structural unit derived from an aromatic polyisocyanate. The adhesive layer has a gel fraction of 10% or more by mass and 80% or less by mass and a stress of less than 50 N/cm$^2$ at 100% strain in a stress-strain curve.

12 Claims, No Drawings

ADHESIVE TAPE

TECHNICAL FIELD

One or more embodiments of the present invention relate to an adhesive tape.

BACKGROUND

Adhesive tapes are used, for example, in electronic devices, such as portable electronic terminals, cameras, and personal computers, or in production processes thereof, for fixing protective panels of image display units to housings, or for fixing various components, such as exterior components, and rigid components, such as batteries.

As such adhesive tapes for fixing components, adhesive tapes with acrylic adhesives are often used. Adhesive tapes with acrylic adhesives are low in cost, but often produced using petroleum-derived raw materials. Thus, there are problems of depletion of petroleum resources and carbon dioxide emissions due to disposal.

As interest in environmental problems, such as global warming, has increased in recent years, there has been a strong social demand for the use of raw materials derived from renewable organic resources (biomass) produced from animals and plants as substitutes for conventional raw materials derived from petroleum. For these reasons, in place of acrylic adhesives, there have been advances in the development of adhesive tapes with adhesives having high biobased contents.

For example, Japanese Unexamined Patent Application Publication No. 2013-216875 discloses an adhesive tape containing a polyester-based adhesive composition that contains a polyester polyol, a polyether polyol, and a cross-linking agent, the polyester polyol being obtained by polycondensation of a dicarboxylic acid having a side chain and a diol.

However, adhesive tapes including adhesive layers made from biomass-derived raw materials have difficulty meeting conventional performance requirements. In particular, a high biobased content of such an adhesive layer disadvantageously results in inferior adhesion strength; thus, it is difficult to improve the adhesion strength while a high biobased content is achieved.

The adhesive tape disclosed in Japanese Unexamined Patent Application Publication No. 2013-216875 is intended to have an initial adhesion strength of and aged adhesion strength of 1 N/25 mm or less, which are very low adhesion strength, and thus is less likely to have sufficiently high adhesive strength.

SUMMARY

One or more embodiments of the present invention have been made in view of the above circumstances, and an adhesive tape capable of achieving both a high biobased content and high adhesion strength is provided.

To address the above, one aspect of one or more embodiments of the present invention is directed to providing an adhesive tape including an adhesive layer, in which the adhesive layer has a biobased content of 50% or more by mass, the adhesive layer contains a reaction product of an urethane resin (A) and a cross-linking agent (B), the urethane resin (A) contains at least a structural unit derived from a biobased polyether polyol and a structural unit derived from an aromatic polyisocyanate, and the adhesive layer has a gel fraction of 10% or more by mass and 80% or less by mass.

Another aspect of one or more embodiments of the present invention is directed to providing an adhesive tape including an adhesive layer, in which the adhesive layer has a biobased content of 50% or more by mass, the adhesive layer contains a reaction product of an urethane resin (A) and a cross-linking agent (B), the urethane resin (A) contains at least a structural unit derived from a biobased polyether polyol and a structural unit derived from an aromatic polyisocyanate, and the adhesive layer has a stress of less than 50 N/cm$^2$ at 100% strain in a stress-strain curve.

DETAILED DESCRIPTION

An adhesive tape according to one or more embodiments of the present invention includes an adhesive layer having a biobased content of 50% or more by mass. The adhesive layer of the adhesive tape according to one or more embodiments of the present invention contains a reaction product of an urethane resin (A) and a cross-linking agent (B), and the urethane resin (A) contains at least a structural unit derived from a biobased polyether polyol and a structural unit derived from an aromatic polyisocyanate. Moreover, the adhesive layer according to one or more embodiments of the present invention satisfies any of the following conditions:
(i) the adhesive layer has a gel fraction of 10% or more by mass and 80% or less by mass; and
(ii) the adhesive layer has a stress of less than 50 N/cm$^2$ at 100% strain in a stress-strain curve.

In the adhesive tape according to one or more embodiments of the present invention, the adhesive layer contains the reaction product of the urethane resin (A) and the cross-linking agent (B), the urethane resin (A) containing the structural unit derived from the biobased polyether polyol and the structural unit derived from the aromatic polyisocyanate, and the adhesive layer satisfies at least one of the specific physical properties of the foregoing conditions (i) and (ii), thereby enabling the achievement of both a high biobased content and high adhesion strength.

1. Adhesive Layer

The adhesive layer according to one or more embodiments of the present invention may have a biobased content of 50% or more by mass, 60% or more by mass, or 70% or more by mass. The adhesive layer may have a higher biobased content, and may have a biobased content of 98% or less by mass, 95% or less by mass, or 92% or less by mass.

The biobased content of the adhesive layer is the mass fraction of a biomass-derived raw material contained in an adhesive composition constituting the adhesive layer based on the total mass of the adhesive composition, and can be calculated from the following computational expression:

Biobased content of adhesive layer (% by mass)=
100×[mass (g) of biomass-derived raw material
in adhesive composition constituting adhesive
layer]/[total mass (g) of adhesive composition
constituting adhesive layer]

where each mass is expressed in terms of the nonvolatile content.

The adhesive layer according to one or more embodiments of the present invention has a gel fraction of 10% or more by mass and 80% or less by mass, and thus can exhibit high adhesion strength while a high biobased content is achieved. In particular, the adhesive layer may have a gel fraction of 10% or more by mass and 70% or less by mass, 10% or more by mass and 60% or less by mass, or 10% or more by mass and 50% or less by mass. When the gel fraction of the adhesive layer is within the above range, higher adhesion strength can be achieved even at a high biobased content.

The gel fraction of the adhesive layer can be determined by the following method. An adhesive composition constituting the adhesive layer is applied onto a release liner to a dry thickness of 50 µm, dried at 100° C. for 3 minutes, aged at 40° C. for 2 days, and cut into a 50 mm×50 mm square, which is used as a sample. The mass (G1) of the sample before immersion in toluene is measured in advance. After the sample is immersed in a toluene solution at 23° C. for 24 hours, the toluene-insoluble content of the sample is separated by filtration through a 300-mesh wire screen. The mass of the residue (G2) after drying at 110° C. for 1 hour is measured. The gel fraction is calculated from the following equation using G1 and G2 measured.

$$\text{Gel fraction (\% by mass)} = (G2/G1) \times 100$$

When the adhesive layer according to one or more embodiments of the present invention has a stress (S100) of less than 50 N/cm² at 100% strain in the stress-strain curve, high adhesion strength can be achieved even at a high biobased content. In particular, the adhesive layer may have a stress of 45 N/cm² or less, 0.5 N/cm² or more and 35 N/cm² or less, or 0.5 N/cm² or more and 25 N/cm² or less, at 100% strain in the stress-strain curve. When the stress of the adhesive layer at 100% strain in the stress-strain curve is within the above range, higher adhesion strength can be achieved even at a high biobased content.

The stress of the adhesive layer at 100% strain in the stress-strain curve can be determined by the following method. An adhesive composition constituting the adhesive layer is applied onto a release liner to a dry thickness of 50 µm, thereby forming an adhesive layer. The adhesive layers are laminated to a total thickness of about 400 µm to form a test piece having a width of 10 mm with reference lines marked at a distance of 20 mm from each other. This test piece is pulled with a tensile tester at a tension speed of 300 mm/min in a measurement environment at a temperature of 23° C. and a relative humidity of 50% to measure a stress-strain curve, what is called an S-S curve. The stress at 100% strain can be determined from the curve.

The adhesive layer according to one or more embodiments of the present invention may satisfy any of the following conditions (i) and (ii), may satisfy only one of the conditions (i) and (ii), or may satisfy both of the conditions (i) and (ii):
(i) the gel fraction is within a predetermined range; and
(ii) the stress at 100% strain in the stress-strain curve is less than a predetermined range.

The thickness of the adhesive layer according to one or more embodiments of the present invention may be, but not necessarily, 2 µm or more, 5 µm or more, or 10 µm or more, from the viewpoint of exhibiting high adhesion strength. The thickness of the adhesive layer may be, but not necessarily, 200 µm or less, 100 µm or less, or 80 µm or less.

The adhesive layer according to one or more embodiments of the present invention contains the reaction product of the urethane resin (A) and the cross-linking agent (B). In other words, the adhesive layer contains the reaction product (cured product) of the adhesive composition containing at least the urethane resin (A) and the cross-linking agent (B). The reaction product of the urethane resin (A) and the cross-linking agent (B) includes a structural unit derived from the urethane resin (A) and a structural unit derived from the cross-linking agent (B) with a urethane bond provided therebetween.

The total of the urethane resin (A) content and the cross-linking agent (B) content of the adhesive layer (solid content of the adhesive composition) may be 80% or more by mass, 90% or more by mass, 95% or more by mass, or 100% by mass. The solid content of the adhesive composition refers to a portion excluding a solvent.

(1) Urethane Resin (A)

The urethane resin (A) is a reaction product of a polyol (a1) and a polyisocyanate (a2), and contains a structural unit derived from the polyol (a1) and a structural unit derived from the polyisocyanate (a2) with a urethane bond provided therebetween. In one or more embodiments of the present invention, the urethane resin (A) contains at least a structural unit derived from a biobased polyether polyol and a structural unit derived from an aromatic polyisocyanate.

In other words, the urethane resin (A) is a reaction product of a composition containing the polyol (a1) and the polyisocyanate (a2), in which the polyol (a1) contains the biobased polyether polyol, and the polyisocyanate (a2) contains an aromatic polyisocyanate.

The urethane resin (A) has two or more hydroxy groups, and may be a hydroxy-terminated urethane resin having a terminal hydroxy group. In the reaction product, contained in the adhesive layer, of the urethane resin (A) and the cross-linking agent (B), the hydroxy groups of the urethane resin (A) form cross-links with the cross-linking agent (B).

The hydroxyl value of the urethane resin (A) is, for example, 0.1 mgKOH/g or more, 0.5 mgKOH/g or more, 1 mgKOH/g or more, 40 mgKOH/g or less, 30 mgKOH/g or less, or 25 mgKOH/g or less, because the formation of the cross-links by reaction with the cross-linking agent (B) can impart of a cohesive force to the adhesive layer. The hydroxyl value can be measured according to JIS K 0070.

The amount of urethane bonds contained in the urethane resin (A) may be 0.8 mmol/g, or 0.85 mmol/g or more, and 3 mmol/g or less, 2.5 mmol/g or less, or 2 mmol/g or less, because high adhesion strength can be exhibited.

The number-average molecular weight of the urethane resin (A) may be 2,000 or more, 3,000 or more, or 4,000 or more, because high adhesion strength can be exhibited. The number-average molecular weight may be 60,000 or less, 40,000 or less, or 20,000 or less.

The weight-average molecular weight of the urethane resin (A) may be 10,000 or more, 15,000 or more, or 20,000 or more, because high adhesion strength can be exhibited. The weight-average molecular weight may be 300,000 or less, 250,000 or less, or 200,000 or less.

The molecular-weight polydispersity index (Mw/Mn) of the urethane resin (A) may be 1.5 or more, 2.0 or more, 2.5 or more, or 5.0 or more. The molecular-weight polydispersity index (Mw/Mn) may be 30 or less, 25 or less, 20 or less, or 15 or less. When the molecular-weight polydispersity index of the urethane resin (A) is in the above range, high adhesion strength can be exhibited.

The number-average molecular weight (Mn) and the weight-average molecular weight (Mw) of the urethane resin (A) represent values measured by gel permeation chromatography in terms of polystyrene under conditions described in the section of Examples below.

The urethane resin (A) content of the adhesive layer (solid content of the adhesive composition) may be 80% or more by mass, 90% or more by mass, or 95% or more by mass, because high adhesion strength can be exhibited.

Polyol (a1)

The polyol (a1) is a compound containing two or more hydroxy groups in one molecule. The polyol (a1) contains at least a biobased polyether polyol (a1-1). The polyol (a1) is a main component in the composition, which is used for the formation of the urethane resin (A), containing the polyol (a1) and the polyisocyanate (a2). The term "main component" refers to a component that is contained in the largest amount among the components contained in the composition.

The biobased content of the polyol (a1) can be adjusted appropriately as long as the adhesive layer can exhibit a predetermined biobased content. For example, the polyol (a1) may have a biobased content of 60% or more by mass, 70% or more by mass, 80% or more by mass, or 100% by mass. In the reaction product of the urethane resin (A) and the cross-linking agent (B) contained in the adhesive layer, a high proportion of a unit skeleton derived from the polyol (a1) contributes to the improvement of the biobased content of the adhesive layer.

The biobased content of the polyol (a1) is the mass fraction of the biomass-derived polyol (a1) to the total mass of the polyol (a1), and can be calculated from the following computational expression:

Biobased content of polyol (a1) (% by mass)=100×[mass (g) of biomass-derived polyol (a1)]/[total mass (g) of polyol (a1)]

where each mass is expressed in terms of the nonvolatile content. Biobased Polyether Polyol (a1-1)

The urethane resin (A) contains, as the structural unit derived from the polyol (a1), a structural unit derived from the biobased polyether polyol (a1-1). The biobased polyether polyol is a polyether polyol derived from renewable organic resources (biomass) derived from plants and animals, and is, for example, a plant-derived polyether polyol. When the polyol (a1) contains the biobased polyether polyol as a main component, the biobased content of the urethane resin and the entire adhesive layer can be increased. The biobased content of the biobased polyether polyol is not particularly limited as long as the biobased content of the adhesive layer can be set in a predetermined range, and can be set, for example, in the same range as the preferable range of the biobased content of the polyol (a1) described above.

The biobased polyether polyol (a1-1) content of the polyol (a1) may be 70% or more by mass, 80% or more by mass, or 90% or more by mass, because high adhesion strength can be exhibited. The upper limit of the biobased polyether polyol (a1-1) content of the polyol (a1) is 100% by mass, and may be 98% or less by mass.

The biobased polyether polyol (a1-1) may be a di- or higher functional polyether polyol that is synthesized from a biomass-derived material and that contains at least two or more ether bonds in the main skeleton in the molecule, and may be a tri- or higher functional biobased polyether polyol. The biobased polyether polyol (a1-1) may be linear or branched. In particular, the biobased polyether polyol (a1-1) may contain a linear biobased polyether diol from the viewpoint of being able to further increase the flexibility and adhesion strength of the adhesive layer. That is, the urethane resin (A) may contain a structural unit derived from the linear biobased polyether diol.

Examples of the linear biobased polyether diol include a linear biobased polyether diol obtained by addition polymerization of a cyclic ether using, as an initiator, one or more low-molecular-weight compounds (for example, compounds each having a molecular weight of less than 500) each containing two groups (—NH— or —OH) each having an active hydrogen atom; and a linear biobased polyether diol obtained by subjecting a cyclic ether to ring-opening polymerization using an acid anhydride as an initiator and then to transesterification with a low-molecular-weight alcohol, such as methanol. The linear biobased polyether diol can be obtained by using a biomass-derived material for at least one of the initiators (the low-molecular-weight compound containing two groups each having active hydrogen atoms and the acid anhydride), the cyclic ethers, and the low-molecular-weight alcohol. Non-limiting examples thereof include a liner polyether diol obtained by addition polymerization of a biomass-derived cyclic ether using, as an initiator, a biomass-derived low-molecular-weight compound containing two groups each having an active hydrogen atom; and a liner polyether diol obtained by subjecting a biomass-derived cyclic ether to ring-opening polymerization using a biomass-derived acid anhydride as an initiator and then to transesterification with a biomass-derived low-molecular-weight alcohol.

Examples of the low-molecular-weight compound (initiator) containing two groups each having an active hydrogen atom include general-purpose compounds each containing two hydroxy groups, such as ethylene glycol, diethylene glycol, triethylene glycol, propylene glycol, trimethylene glycol, 1,3-propanediol, 1,4-butanediol, 1,6-hexanediol, and bisphenol A. Among the low-molecular-weight compounds (initiators) each containing two groups each having an active hydrogen atom, examples of a biomass-derived compound include aliphatic glycols, such as ethylene glycol, diethylene glycol, triethylene glycol, trimethylene glycol, 1,2-propylene glycol, 1,3-propanediol, 2-methyl-1,3-propanediol, 1,2-butanediol, 1,3-butanediol, 1,4-butanediol, 1,5-pentanediol, 1,6-hexanediol, 3-methyl-1,5-pentanediol, neopentyl glycol, diethylene glycol, dipropylene glycol, 2,2,4-trimethyl-1,5-pentanediol, 2-ethyl-2-butylpropanediol, 1,9-nonanediol, 2-methyloctanediol, 1,10-decanediol, 1,4-cyclohexanedimethanol, and 1,2-cyclohexanedimethanol, bisphenol A, polytetramethylene glycol, polypropylene glycol, polyethylene glycol, polycarbonate glycol, fatty esters derived from castor oil, dimer diols derived from, for example, oleic acid or erucic acid, and glycerol monostearate. These can be used alone or in combination of two or more.

The biomass-derived ethylene glycol can be produced from bioethanol. The biomass-derived 1,3-propanediol can be produced by fermenting and degrading a plant such as corn using, for example, anaerobic bacteria to obtain glucose, converting the glucose into glycerol, dehydrating the glycerol to obtain 3-hydroxypropyl aldehyde (HPA), and reducing the 3-hydroxypropyl aldehyde (HPA). The biomass-derived 1,4-butanediol can be produced by producing glycol from a plant, fermenting the glycol to obtain succinic acid, and hydrogenating the succinic acid. The 1,5-pentanediol and 1,6-pentanediol can be produced by obtaining hemicellulose from biomass, subjecting the hemicellulose to a dehydration reaction to obtain furfural or pyrancarbaldehyde, and then subjecting the furfural or pyrancarbaldehyde to hydrogenolysis. Polyalkylene glycols and other products can be produced by, for example, dehydration, cyclization, or polymerization of these compounds.

Examples of the cyclic ethers include epoxide compounds, such as ethylene oxide and epichlorohydrin; and cyclic ethers, such as tetrahydrofuran, having 4 or more carbon atoms (4 to 6 carbon atoms, or 4 carbon atoms). Among the cyclic ethers, examples of the biomass-derived compound include epoxide compounds, such as ethylene oxide; and cyclic ethers, such as tetrahydrofuran. The cyclic ethers can be produced by dehydration and cyclization of low-molecular-weight polyols. These can be used alone or in combination of two or more.

Preferably, the above-mentioned linear biobased polyether diol is not branched because it easily exhibits adhesion strength. That is, the alkylene group in the oxyalkylene unit may be a linear alkylene group and contains no substituent, such as an alkyl group.

The number of carbon atoms in the oxyalkylene unit contained in the linear biobased polyether diol may be 2 or more, or 3 or more, and 4 or less, because both of high flexibility and a high cohesive force are easily achieved.

The linear biobased polyether diol content of the polyol (a1) may be 70% or more by weight, 80% or more by weight, 90% or more by weight, 95% or more by weight, or 100% by weight, because a higher biobased content can be achieved.

As the biobased polyether polyol (a1-1), a branched biobased polyether diol or a tri- or higher-functional biobased polyether polyol may be used. These may be used alone or in combination with another biobased polyether polyol (for example, a linear biobased polyether diol). When the biobased polyether polyol (a1-1) contains a linear biobased polyether diol and a tri- or higher functional biobased polyether polyol, the tri- or higher functional biobased polyether polyol can exhibit the same function as a polyfunctional polyol (a1-2) described below.

Examples of the tri- or higher-functional biobased polyether polyol include compounds each obtained by ring-opening polymerization of a cyclic ether using, as an initiator, one or more low-molecular-weight compounds (for example, compounds each having a molecular weight of 50 or more and less than 500) each containing three or more groups (—NH— or —OH) each having an active hydrogen atom. The tri- or higher-functional biobased polyether polyol can be obtained by using a biomass-derived material for at least one of the low-molecular-weight compound and the cyclic ether. Non-limiting examples thereof include biobased polyether polyols each obtained by ring-opening polymerization of a biomass-derived cyclic ether using a biomass-derived low-molecular-weight compound as an initiator.

Examples of the low-molecular-weight compound containing three or more groups each having an active hydrogen atom include glycerol, trimethylolethane, and trimethylolpropane. Examples of the cyclic ethers include tetrahydrofuran and an alkyl-substituted tetrahydrofuran. The use of a biomass-derived low-molecular-weight compound and/or a biomass-derived cyclic ether can result in a tri- or higher-functional biobased polyether polyol.

Specific examples of the biobased polyether polyol (a1-1) include poly(1,3-propanediol) and polytetramethylene ether glycol. For example, the biobased polyether polyol (a1-1) may be a biobased polyether polyol, such as a difunctional biobased polyether polyol, e.g., polyethylene glycol, polypropylene glycol, polybutylene glycol, or polytetramethylene glycol; a trifunctional biobased polyether polyol, e.g., trimethylolpropane trioleoxyethylene ether; a tetrafunctional biomass polyether polyol, e.g., pentaerythritol polyoxyethylene ether; or polyoxyalkylene glycol, e.g., polytrimethylene ether glycol.

The number-average molecular weight of the biobased polyether polyol (a1-1) may be 500 or more, 700 or more, 900 or more, and 10,000 or less, 5,000 or less, or 3,000 or less, from the viewpoint of easily achieving both of high flexibility and a high cohesive force, although the number-average molecular weight varies, depending on the type of polyether polyol used.

The number-average molecular weight (Mn) of the biobased polyether polyol (a1-1) is a value measured by a method for measuring the number-average molecular weight (Mn) of a urethane resin using gel permeation chromatography in terms of polystyrene under conditions described in the section of Examples below.

Polyfunctional Polyol (a1-2)

To further increase the cohesive force, the polyol (a1) may contain the polyfunctional polyol (a1-2) other than the biobased polyether polyol (a1-1). In other words, the urethane resin (a) may have, as the structural unit derived from the polyol (a1), a structural unit derived from the polyfunctional polyol (a1-2) other than the biobased polyether polyol, in addition to the structural unit derived from the biobased polyether polyol.

The polyfunctional polyol (a1-2) may be derived from biomass or petroleum (non-biomass). The polyfunctional polyol (a1-2) may be derived from biomass because the biobased content of the polyol (a1) and the urethane resin (a) can be increased.

As the polyfunctional polyol (a1-2), a di- or higher-functional polyol other than the biobased polyether polyol (a1-1) can be used. In particular, a tri- or higher-functional polyol is preferred because a high cohesive force can be exhibited by a reaction with the biobased polyether polyol (a1-1). When a linear biobased polyether diol is contained as the biobased polyether polyol (a1-1), a polyfunctional polyol (a1-2-2) with tri or higher functionalities may be contained in addition to the biobased polyether polyol (a1-1) because both of high flexibility and a high cohesive force of the adhesive layer can be achieved and thereby the adhesion strength can be further increased.

Examples of the difunctional polyol (a1-2-1) include polymer diols, such as non-biobased polyether diols, polyester diols, polycarbonate diols, and polybutadiene diols; low-molecular-weight diols; and acid group-containing polyols.

Examples of the non-biomass polyether diols include compounds each obtained by addition polymerization of a cyclic ether using, as an initiator, one or more low-molecular-weight compounds (for example, compounds each having a molecular weight of less than 500) each containing two groups (—NH or —OH) each having an active hydrogen atom; compounds each obtained by addition polymerization of an alkylene oxide using, as an initiator, one or more low-molecular-weight compounds (for example, compounds each having a molecular weight of less than 500) each containing two groups (—NH or —OH) each having an active hydrogen atom; and compounds each obtained by subjecting a cyclic ether to ring-opening polymerization using an acid anhydride as an initiator and then to transesterification with a low-molecular-weight alcohol, such as methanol.

Examples of the initiators include compounds each containing two hydroxy groups, such as ethylene glycol, diethylene glycol, triethylene glycol, propylene glycol, trimethylene glycol, 1,3-butanediol, 1,4-butanediol, 1,6-hexanediol, and bisphenol A.

Examples of the cyclic ethers include epoxide compounds, such as ethylene oxide, propylene oxide, butylene oxide, styrene oxide, and epichlorohydrin; and cyclic ethers, such as tetrahydrofuran, having 4 or more carbon atoms (4 to 6 carbon atoms, or 4 carbon atoms).

Examples of the polyester diols that can be used include an esterification reaction product obtained by esterifying a low-molecular-weight diol and a dicarboxylic acid; a product obtained by subjecting a cyclic ester compound, such as ε-caprolactone, to ring-opening polymerization; and a copolymer of the esterification reaction product and the product obtained by the ring-opening polymerization.

Examples of the low-molecular-weight diol that can be esterified with the dicarboxylic acid to form a polyester diol include aliphatic diols, such as ethylene glycol, diethylene glycol, triethylene glycol, tetraethylene glycol, 1,2-propanediol, 1,3-propanediol, dipropylene glycol, tripropylene glycol, 1,2-butanediol, 1,3-butanediol, 1,4-butanediol, 2,3-butanediol, 1,5-pentanediol, 1,5-hexanediol, 1,6-hexanediol, 2,5-hexanediol, 1,7-heptanediol, 1,8-octanediol, 1,9-nonanediol, 1,10-decanediol, 1,11-undecanediol, 1,12-dodecanediol, 2-methyl-1,3-propanediol, neopentyl glycol, 2-butyl-2-ethyl-1,3-propanediol, 3-methyl-1,5-pentanediol, 2-ethyl-1,3-hexanediol, and 2-methyl-1,8-octanediol; alicyclic diols, such as 1,4-cyclohexanedimethanol; and aromatic diols, such as hydroquinone, resorcin, bisphenol A, bisphenol F, and 4,4'-biphenol.

Examples of the dicarboxylic acid include aliphatic dicarboxylic acids, such as succinic acid, adipic acid, sebacic acid, and dodecanedicarboxylic acid; aromatic dicarboxylic acids, such as terephthalic acid, isophthalic acid, phthalic acid, and naphthalenedicarboxylic acid; and anhydrides and esters thereof.

Examples of the polycarbonate diol include reaction products each obtained by reacting a carbonic acid ester and/or phosgene with a low-molecular-weight diol using, as an initiator, one or more low-molecular-weight compounds each having two active hydrogen atoms (for example, compounds each having a molecular weight of 50 or more and less than 500). As the carbonic acid ester, one or more types of carbonic acid esters can be used. Examples thereof include aliphatic carbonates, such as alkyl carbonates, e.g., methyl carbonate and ethyl carbonate, and dialkyl carbonates, e.g., dimethyl carbonate and diethyl carbonate; carbonates each including an alicyclic structure (hereinafter, the phrase "including an alicyclic structure" is also referred to simply as "alicyclic"), such as cyclocarbonate; and aromatic carbonates, such as diphenyl carbonate.

Examples of the low-molecular-weight diol that can react with the carbonic acid ester and phosgene include the same low-molecular-weight diols as the low-molecular-weight diols that can be esterified with the dicarboxylic acid to form a polyester diol.

Examples of the acid group-containing polyol include hydroxy acids, such as 2,2-dimethylolpropionic acid, 2,2-dimethylolbutanoic acid, 2,2-dimethylolbutyric acid, and 2,2-dimethylolvaleric acid; and a reaction product of the carboxy group-containing polyol and the polycarboxylic acid.

Examples of the tri- or higher-functional polyol (a1-2-2) include polymer polyols, such as non-biobased polyether polyols, polyester polyols, polycarbonate polyols, and polybutadiene polyols; and low-molecular-weight polyols having a molecular weight of less than 500.

Examples of the non-biobased polyether polyol include compounds each obtained by addition polymerization of an alkylene oxide using as an initiator, one or more low-molecular-weight compounds (for example, compounds each having a molecular weight of 50 or more and less than 500) each containing three or more groups (—NH or —OH) each having an active hydrogen atom; and compounds each obtained by ring-opening polymerization of a cyclic ether using, as an initiator, one or more low-molecular-weight compounds (for example, compounds each having a molecular weight of 50 or more and less than 500) each containing three or more groups (—NH or —OH) each having an active hydrogen atom.

As the compound containing three or more groups (—NH or —OH) each having an active hydrogen atom, one or more types thereof can be used. Examples thereof include glycerol, trimethylolethane, and trimethylolpropane.

As the alkylene oxide, one or more types thereof can be used. Examples thereof include ethylene oxide, propylene oxide, butylene oxide, and epichlorohydrin. Examples of the cyclic ethers include tetrahydrofuran and an alkyl-substituted tetrahydrofuran.

Examples of the polyester polyol that can be used include an esterification reaction product obtained by esterifying a low-molecular-weight polyol and a polycarboxylic acid using, as an initiator, one or more low-molecular-weight compounds (for example, compounds each having a molecular weight of 50 or more and less than 500) each containing three or more groups (—NH or —OH) each having an active hydrogen atom; a product obtained by subjecting a cyclic ester compound, such as ε-caprolactone, to ring-opening polymerization; and a copolymer of the esterification reaction product and the product obtained by the ring-opening polymerization.

Examples of the low-molecular-weight polyol that can be esterified with the polycarboxylic acid to form a polyester polyol include aliphatic polyols, such as ethylene glycol, diethylene glycol, triethylene glycol, tetraethylene glycol, 1,2-propanediol, 1,3-propanediol, dipropylene glycol, tripropylene glycol, 1,2-butanediol, 1,3-butanediol, 1,4-butanediol, 2,3-butanediol, 1,5-pentanediol, 1,5-hexanediol, 1,6-hexanediol, 2,5-hexanediol, 1,7-heptanediol, 1,8-octanediol, 1,9-nonanediol, 1,10-decanediol, 1,11-undecanediol, 1,12-dodecanediol, 2-methyl-1,3-propanediol, neopentyl glycol, 2-butyl-2-ethyl-1,3-propanediol, 3-methyl-1,5-pentanediol, 2-ethyl-1,3-hexanediol, and 2-methyl-1,8-octanediol; alicyclic polyols, such as 1,4-cyclohexanedimethanol; and aromatic polyols, such as hydroquinone, resorcin, bisphenol A, bisphenol F, and 4,4'-biphenol.

Examples of the polycarboxylic acid include aliphatic dicarboxylic acids, such as succinic acid, adipic acid, sebacic acid, and dodecanedicarboxylic acid; aromatic dicarboxylic acids, such as terephthalic acid, isophthalic acid, phthalic acid, and naphthalenedicarboxylic acid; and anhydrides and esters thereof.

Examples of the polycarbonate polyol include reaction products each obtained by reacting a carbonic acid ester and/or phosgene with a low-molecular-weight polyol using, as an initiator, one or more low-molecular-weight compounds each containing three or more groups (—NH or —OH) each having an active hydrogen atom (for example, compounds each having a molecular weight of 50 or more and less than 500). As the carbonic acid ester, one or more types of carbonic acid esters can be used. Examples thereof include aliphatic carbonates, such as alkyl carbonates, e.g., methyl carbonate and ethyl carbonate, and dialkyl carbonates, e.g., dimethyl carbonate and diethyl carbonate; carbonates each including an alicyclic structure (hereinafter, the phrase "including an alicyclic structure" is also referred to simply as "alicyclic"), such as cyclocarbonate; and aromatic carbonates, such as diphenyl carbonate.

Examples of the low-molecular-weight polyol that can react with the carbonic acid ester and phosgene include the same low-molecular-weight polyols as the low-molecularweight polyols that can be esterified with the polycarboxylic acid to form a polyester polyol.

The number of functional groups of the tri- or higher-functional polymer polyol is 3 or more, and may be 6 or less, 5 or less, or 4 or less, because the control of the reaction is relatively easy.

The molecular weight of the tri- or higher-functional polymer polyol may be 500 or more, 700 or more, or 900 or more, and 10,000 or less, 5,000 or less, or 3,000 or less, because a cohesive force can be efficiently imparted.

Examples of the tri- or higher-functional low-molecular-weight polyol include low-molecular-weight triols, such as trimethylolethane and trimethylolpropane; low-molecular-weight tetraols, such as pentaerythritol; and low-molecular-weight hexaols, such as dipentaerythritol.

The number of functional groups of the tri- or higher-functional low-molecular-weight polyol is 3 or more, and may be 6 or less, 5 or less, or 4 or less, because the control of the reaction is relatively easy.

The molecular weight of the tri- or higher-functional low-molecular-weight polyol may be less than 500, and is, for example, 50 or more, because the cohesive force can be efficiently imparted.

The polyfunctional polyol (a1-2) content of the polyol (a1) may be, but not necessarily, 0.1% or more by mass, 0.5% or more by mass, or 0.8% or more by mass. The polyfunctional polyol (a1-2) content of the polyol (a1) may be, but not necessarily, 20% or less by mass, 10% or less by mass, or 7% or less by mass. When the polyfunctional polyol (a1-2) content is within the above range, it is possible to improve the cohesive force due to a reaction with the polyisocyanate (a2) while a decrease in the biobased content of the polyol (a1) and the entire adhesive layer is suppressed. In particular, when the biobased polyether polyol (a1-1) contains a linear polyether diol, the content of the polyfunctional polyol (a1-2-2) with tri or higher functionalities may be within the above range.

Others

The polyol (a1) may contain at least the biobased polyether polyol (a1-1), and may contain a combination of the various polyols described above. As an example of a preferred embodiment of the polyol (a1), the polyol (a1) has a composition containing a biobased polyether diol (a1-1-1) and a tri- or higher-functional polyol, in which the tri- or higher-functional polyol contains at least one selected from the group consisting of a tri- or higher-functional biobased polyether polyol (a1-1-2) and a tri- or higher-functional polyol other than the biobased polyether polyol (a1-2-2).

Polyisocyanate (a2)

The polyisocyanate (a2) is a compound containing two or more isocyanate groups and contains at least an aromatic polyisocyanate.

The urethane resin (A) has a structural unit derived from the aromatic polyisocyanate as the structural unit derived from the polyisocyanate (a2). When the polyisocyanate (a2) contains the aromatic polyisocyanate as a main component, an appropriate cohesive force can be exhibited in the urethane resin and the entire adhesive layer to increase the adhesion strength.

The aromatic polyisocyanate content of the polyisocyanate (a2) may be 50% or more by mass, 60% or more by mass, 70% or more by mass, or 100% by mass. When the aromatic polyisocyanate content is within the above range, an appropriate cohesive force can be exhibited in the urethane resin and the entire adhesive layer.

Examples of the aromatic polyisocyanate include methylene diphenyl diisocyanates (MDIs: 4,4'-MDI, 2,4'-MDI, and 2,2'-MDI, and mixtures thereof); polymethylene polyphenyl polyisocyanates (polymeric MDIs); modified MDIs, such as carbodiimidized diphenylmethane polyisocyanate; aromatic diisocyanates, such as phenylene diisocyanate, tolylene diisocyanates (TDIs: 2,4-TDI and 2,6-TDI, and mixtures thereof), xylene diisocyanate (XDI), tetramethylxylene diisocyanate, 1,5-naphthalene diisocyanate (NDI), and tetramethylxylylene diisocyanate; and tri- or higher-functional aromatic polyisocyanates, such as adduct forms, isocyanurate forms, and biuret forms thereof. These may be used alone or in combination of two or more.

Among these, the aromatic polyisocyanate may be one or more selected from methylene diphenyl diisocyanates (MDIs), tolylene diisocyanates (TDIs), and adduct forms, isocyanurate forms, and biuret forms thereof.

The polyisocyanate (a2) may contain a polyisocyanate other than the aromatic polyisocyanate as long as the effect of one or more embodiments of the present invention is not impaired. That is, the urethane resin (A) may contain, as the structural unit derived from the polyisocyanate (a2), a structural unit derived from a polyisocyanate other than the aromatic polyisocyanate.

Examples of the polyisocyanate other than the aromatic polyisocyanate include aliphatic polyisocyanates and alicyclic polyisocyanates. Examples of the aliphatic polyisocyanates include aliphatic diisocyanates, such as hexamethylene diisocyanate and lysine diisocyanate, and tri- or higher-functional aliphatic polyisocyanates, such as adduct forms, isocyanurate forms, and biuret forms thereof. Examples of the alicyclic polyisocyanates include alicyclic diisocyanates, such as isophorone diisocyanate, 1,3-bis(isocyanatomethyl)cyclohexane, 4,4'-dicyclohexylmethane diisocyanate, 2,4- and/or 2,6-methylcyclohexane diisocyanate, cyclohexylene diisocyanate, methylcyclohexylene diisocyanate, bis(2-isocyanatoethyl)-4-cyclohexylene-1,2-dicarboxylate, 2,5- and/or 2,6-norbornane diisocyanate, dimer acid diisocyanate, bicycloheptane triisocyanate, and hydrogenated xylylene diisocyanate, and tri- or higher-functional alicyclic polyisocyanates, such as adduct forms, isocyanurate forms, and biuret forms thereof.

When the polyisocyanate (a2) contains a tri- or higher-functional polyisocyanate, such as an adduct form, isocyanurate form, or biuret form thereof, the tri- or higher-functional polyisocyanate content of the polyisocyanate (a2) may be 1% or more by mass, 5% or more by mass, or 10% or more by mass, because a cohesive force can be exhibited. The tri- or higher-functional polyisocyanate content may be 50% or less by mass, 40% or less by mass, or 30% or less by mass.

The mole ratio (NCO/OH) of the isocyanate groups contained in the polyisocyanate (a2) to the hydroxy groups contained in the polyol (a1) (when a chain extender (a3) described below is contained, the total of the hydroxy groups contained in the polyol (a1) and the active hydrogen atoms contained in the chain extender (a3)) is 0.5 or more, 0.55 or more, or 0.6 or more, and less than 1, or 0.9999 or less, because a cohesive force can be exhibited.

The polyisocyanate (a2) may be a biomass-derived polyisocyanate (biobased polyisocyanate) or a petroleum-derived polyisocyanate (non-biobased polyisocyanate). Of these, the biobased polyisocyanate is more preferred because the biobased content of the urethane resin and the adhesive layer can be increased.

Chain Extender (a3)

The urethane resin (A) may be prepared by allowing a reaction product of the polyol (a1) and the polyisocyanate (a2) to further react with the chain extender (a3). That is, the urethane resin (A) may be a reaction product of a composition containing the polyol (a1), the polyisocyanate (a2), and the chain extender (a3), more specifically, may be a reaction product of a composition containing the polyol (a1) and the polyisocyanate (a2) and the chain extender (a3).

As the chain extender (a3), one or more types thereof can be used. Examples thereof include compounds each having two or more active hydrogen atoms; and polyamines. Examples of the compounds each having two or more active hydrogen atoms include aliphatic chain extenders, such as ethylene glycol, 1,2-propanediol, 1,3-butanediol, 1,4-butanediol, 2,3-butanediol, 3-methyl-1,5-pentanediol, 1,6-hexanediol, 3,3'-dimethylolheptane, neopentyl glycol, 3,3-bis(hydroxymethyl)heptane, diethylene glycol, dipropylene glycol, polyoxypropylene glycol, polyoxybutylene glycol, glycerol, and trimethylolpropane; and alicyclic chain extenders, such as 1,2-cyclobutanediol, 1,3-cyclopentanediol, 1,4-cyclohexanediol, cycloheptanediol, cyclooctanediol, 1,4-cyclohexanedimethanol, hydroxypropylcyclohexanol, tricyclo[5.2.1.0$^{2,6}$]decanedimethanol, bicyclo[4.3.0]nonanediol, dicyclohexanediol, bicyclo[4.3.0]nonanedimethanol, spiro[3.4]octanediol, butylcyclohexanediol, 1,1'-bicyclohexylidenediol, cyclohexanetriol, hydrogenated bisphenol A, and 1,3-adamantanediol. Among these, preferred are aliphatic alkylene glycols, such as ethylene glycol, propylene glycol, 1,4-butanediol, 1,6-hexanediol, diethylene glycol, neopentyl glycol, and 1,3-butanediol, and alicyclic glycols, such as cyclohexanedimethanol. Examples of the polyamines include polyamine extenders, such as ethylenediamine, 1,2-propanediamine, 1,6-hexamethylenediamine, piperazine, 2,5-dimethylpiperazine, isophoronediamine, 4,4'-dicyclohexylmethanediamine, 3,3'-dimethyl-4,4'-dicyclohexylmethanediamine, 1,4-cyclohexanediamine, N-hydroxymethylaminoethylamine, N-ethylaminoethylamine, N-methylaminopropylamine, diethylenetriamine, dipropylenetriamine, triethylenetetramine, hydrazine, N,N'-dimethylhydrazine, 1,6-hexamethylenebishydrazine, succinic acid dihydrazide, adipic acid dihydrazide, glutaric acid dihydrazide, sebacic acid dihydrazide, isophthalic acid dihydrazide, 3-semicarbazidepropionic acid hydrazide, 3-semicarbazide propyl carbazate, and semicarbazide-3-semicarbazidemethyl-3,5,5-trimethylcyclohexane.

The amount of chain extender (a3) may be in the range of 0 to 5 parts by mass, 0 to 3 parts by mass, or 0 to 1 part by mass, based on 100 parts by mass of the polyol (a1) because the cohesive force of the urethane resin can be exhibited.

The chain extender (a3) may be derived from petroleum or may be derived from biomass. In particular, a biomass-derived chain extender is more preferred because the biobased content of the urethane resin and the adhesive layer can be increased.

Terminator (a4)

The urethane resin (A) may be prepared by allowing a reaction product of the polyol (a1), the polyisocyanate (a2), and the chain extender (a3) used as needed to further react with a terminator (a4). The use of the terminator (a4) enables deactivation of the isocyanate groups.

The terminator (a4) may be an alcohol. Examples thereof include monofunctional alcohols, such as methanol, ethanol, propanol, and butanol; difunctional alcohols, such as 1,2-propylene glycol and 1,3-butylene glycol; polyfunctional polyols; and alkanol amine compounds, such as alkanol amines, e.g., ethanolamine, and alkanol diamines, e.g., diethanolamine.

The terminator (a4) may be derived from petroleum or may be derived from biomass. In particular, a biomass-derived terminator is more preferred because the biobased content of the urethane resin and the adhesive layer can be increased.

Others

The urethane resin (A) can be produced by copolymerizing the polyol (a1) and the polyisocyanate (a2) and, if necessary, allowing the resulting mixture to further react with the chain extender (a3) and/or the terminator (a4). The reaction may be performed in the presence of an organic solvent. A urethanization catalyst may be present during the reaction.

As the organic solvent, one or more organic solvents can be used. Examples thereof include aromatic hydrocarbon solvents, such as toluene; ester solvents, such as ethyl acetate and butyl acetate; ketone solvents, such as acetone, methyl ethyl ketone, cyclohexanone, and 3-pentanone; ether solvents, such as propylene glycol monomethyl ether, propylene glycol monoethyl ether, propylene glycol mono-n-propyl ether, and ethyl carbitol; nitrile solvents, such as acetonitrile, propionitrile, isobutyronitrile, and valeronitrile; sulfoxide solvents, such as dimethyl sulfoxide; and amide solvents, such as methylformamide, dimethylacetamide, and N-methyl-2-pyrrolidone.

Examples of the urethanization catalyst that can be used include nitrogen-containing compounds, such as triethylamine, triethylenediamine, and N-methylmorpholine; metal salts, such as potassium acetate, zinc stearate, and stannous octoate; and organometallic compounds, such as dibutyltin laurate, dioctyltin dineodecanoate, and zirconium tetraacetylacetonate.

The urethane resin (A) contains at least a structural unit derived from a biobased polyether polyol and a structural unit derived from an aromatic polyisocyanate, and may further contain a structural unit derived from a tri- or higher-functional polyol. The structural unit derived from the tri- or higher-functional polyol contained in the urethane resin (A) may be, for example, a structural unit derived from a tri- or higher-functional biobased polyether polyol, may be a structural unit derived from a polyfunctional polyol (a1-2) with tri or higher functionalities other than a biobased polyether polyol, or may be both.

Examples of the urethane resin (A) having the above-described structural unit include the following embodiments. In one embodiment, the urethane resin (A) can be a reaction product of a composition that contains at least the polyol (a1) containing the tri- or higher-functional biobased polyether polyol (a1-1) and the polyisocyanate (a2) containing the aromatic polyisocyanate (a2). In an example of another embodiment, the urethane resin (A) can be a reaction product of a composition that contains at least the polyol (a1) containing the di- or higher-functional biobased polyether polyol (a1-1) and the polyfunctional polyol (a1-2) with tri or higher functionalities other than the biobased polyether polyol (a1-1), and the polyisocyanate (a2) containing an aromatic polyisocyanate. In particular, the urethane resin (A) can be a reaction product of a composition that contains at least the polyol (a1) and the polyisocyanate (a2) containing the aromatic polyisocyanate, the polyol (a1) containing the linear biobased polyether polyol (a1-1-1) and at least one of the tri- or higher-functional biobased polyether polyol (a1-1-2) and the polyfunctional polyol (a1-2) with tri or higher functionalities other than the biobased polyether polyol (a1-1).

The urethane resin (A) may further contain a structural unit derived from the chain extender (a3) in addition to the structural unit derived from the biobased polyether polyol and the structural unit derived from the aromatic polyisocyanate. As the urethane resin (A) containing the above-mentioned structural units, for example, the urethane resin (A) can be a reaction product of a composition that contains the polyol (a1) containing the biobased polyether polyol (a1-1), the polyisocyanate (a2) containing the aromatic polyisocyanate, and the chain extender (a3). More specifically, the urethane resin (A) can be a reaction product of a composition that contains a reaction product of the polyol (a1) containing the biobased polyether polyol (a1-1) and the polyisocyanate (a2) containing the aromatic polyisocyanate, and the chain extender (a3).

(2) Cross-Linking Agent (B)

The cross-linking agent (B) needs only to be capable of reacting with the urethane resin (A) to form a reaction product (cured product), and may be a compound containing, in one molecule, two or more groups capable of reacting with hydroxy groups. Examples of such a cross-linking agent (B) include isocyanate compounds each containing two or more isocyanate groups in one molecule; and epoxy compounds each containing two or more epoxy groups in one molecule. Among these, an isocyanate compound may be contained because high adhesion strength can be exhibited.

Examples of the isocyanate compounds that can be used include aliphatic polyisocyanates, alicyclic polyisocyanates, and aromatic polyisocyanates. These isocyanate compounds may be used alone or in combination of two or more.

Examples of the aliphatic polyisocyanates include aliphatic diisocyanates, such as hexamethylene diisocyanate (HDI), dimer acid diisocyanate, norbornene diisocyanate, lysine diisocyanate, and tetramethylxylylene diisocyanate, and tri- or higher-functional aliphatic polyisocyanates, such as adduct forms, isocyanurate forms, and biuret forms thereof. These may be used alone or in combination of two or more.

Examples of the alicyclic polyisocyanates include alicyclic diisocyanates, such as isophorone diisocyanate (IPDI), hydrogenated diphenylmethane diisocyanate (hydrogenated MDI), hydrogenated xylylene diisocyanate (hydrogenated XDI), cyclohexane diisocyanate, dicyclohexylmethane diisocyanate, and isophorone diisocyanate, and tri- or higher-functional alicyclic polyisocyanates, such as adduct forms, isocyanurate forms, and biuret forms thereof. These may be used alone or in combination of two or more.

Examples of the aromatic polyisocyanate include methylene diphenyl diisocyanates (MDIs: 4,4'-MDI, 2,4'-MDI, and 2,2'-MDI, and mixtures thereof); polymethylene polyphenyl polyisocyanates (polymeric MDIs); modified MDIs, such as carbodiimidized diphenylmethane polyisocyanate; aromatic diisocyanates, such as phenylene diisocyanate, tolylene diisocyanates (TDIs: 2,4-TDI and 2,6-TDI, and mixtures thereof), xylene diisocyanate (XDI), tetramethylxylene diisocyanate, 1,5-naphthalene diisocyanate (NDI), and tetramethylxylylene diisocyanate; and tri- or higher-functional aromatic polyisocyanates, such as adduct forms, isocyanurate forms, and biuret forms thereof. These may be used alone or in combination of two or more.

Among these, as the isocyanate compound, an aliphatic polyisocyanate or aromatic polyisocyanate is preferred because the adhesive layer can exhibit high adhesion strength by a reaction with the urethane resin (A). A tri- or higher-functional aromatic polyisocyanate is preferred because the adhesion strength of the adhesive layer can be further increased.

The isocyanate compound content is such an amount that the equivalent ratio of the hydroxy groups in the urethane resin (A) to the isocyanate groups of the isocyanate cross-linking agent may be 0.1 or more, 0.15 or more, or 0.2 or more, and 10 or less, 8 or less, or 6 or less, because high adhesion strength can be exhibited.

The above-described epoxy compounds may be used alone or in combination of two or more. Examples thereof include diglycidyl ethers of aliphatic, alicyclic, or aromatic polyol compounds, such as ethylene glycol diglycidyl ether, propylene glycol diglycidyl ether, neopentyl glycol diglycidyl ether, 1,6-hexanediol diglycidyl ether, diethylene glycol diglycidyl ether, polyethylene glycol diglycidyl ether, polypropylene glycol diglycidyl ether, glycerol diglycidyl ether, cyclohexanedimethanol diglycidyl ether, resorcinol diglycidyl ether, phenol (EO)5 glycidyl ether, bis(p-hydroxyphenyl)methane diglycidyl ether, 2,2-bis(p-hydroxyphenyl) propane diglycidyl ether, tris(p-hydroxyphenyl) methane polyglycidyl ether, 1,1,2,2-tetrakis(p-hydroxyphenyl)ethane polyglycidyl ether, and lauryl alcohol (EO)15 glycidyl ether; polyglycidyl ethers of aliphatic, alicyclic, or aromatic polyol compounds, such as glycerol triglycidyl ether, diglycerol polyglycidyl ether, polyglycerol polyglycidyl ether, trimethylolpropane triglycidyl ether, sorbitol polyglycidyl ether, polyglycerol polyglycidyl ether, pentaerythritol polyglycidyl erythritol, and diglycerol polyglycidyl ether; diglycidyl esters or polyglycidyl esters of aliphatic or aromatic acids, such as terephthalic acid diglycidyl ester, isophthalic acid diglycidyl ester, naphthalenedicarboxylic acid diglycidyl ester, trimellitic acid diglycidyl ester, adipic acid diglycidyl ester, and sebacic acid diglycidyl ester; triglycidyl aminophenol; triglycidyl tris(2-hydroxyethyl) isocyanurate, triglycidyl isocyanurate; and o-cresol-type epoxy and phenol novolac-type epoxy.

The epoxy compound content is such an amount that the equivalent ratio of the hydroxy groups in the urethane resin (A) to the epoxy groups in the epoxy compound may be 1 or more, 1.2 or more, or 1.5 or more, and 5 or less, 4 or less, or 3 or less, because high adhesion strength can be exhibited.

The isocyanate compound content of the cross-linking agent (B) may be 80% or more by mass, 90% or more by mass, 95% or more by mass, or 100% by mass, that is, the cross-linking agent (B) is an isocyanate cross-linking agent, because high adhesion strength can be exhibited.

The cross-linking agent (B) content may be such an amount that the adhesive layer can achieve the physical properties described above. The cross-linking agent (B) content may be 0.1 parts or more by mass and 10 parts or less by mass, 0.2 parts or more by mass and 7 parts or less by mass, or 0.2 parts or more by mass and 5 parts or less by mass, based on 100 parts by mass of the urethane resin. When the amount of cross-linking agent (B) reacted with the urethane resin (A) is within the above range, the gel fraction of the adhesive layer and the stress at 100% strain in the stress-strain curve can be adjusted within predetermined ranges to achieve high adhesion strength.

The cross-linking agent (B) may be derived from petroleum or may be derived from biomass. In particular, the cross-linking agent (B) may be derived from biomass because the biobased content of the urethane resin and the adhesive layer can be increased.

(3) Optional Component

The adhesive layer (adhesive composition) may further contain a curing catalyst. Examples of the curing catalyst include the same compounds as those exemplified as the urethanization catalyst. When the curing catalyst is contained, the curing catalyst content may be 0.001 parts or more by mass, 0.005 parts or more by mass, or 0.01 parts or more by mass, and 1 part or less by mass, 0.1 parts or less by mass, or 0.05 parts or less by mass, based on 100 parts by mass of the urethane resin (A).

The adhesive layer (adhesive composition) may further contain other additives, such as a plasticizer, a silane coupling agent, an antioxidant, a light stabilizer, a rust inhibitor, a thixotropy-imparting agent, a sensitizer, a polymerization inhibitor, a leveling agent, a tackifier, an antistatic agent, and a flame retardant.

2. Optional Configuration

The adhesive tape according to one or more embodiments of the present invention needs only to include at least the above-described adhesive layer, and can have any configuration as necessary.

Substrate

The adhesive tape according to one or more embodiments of the present invention can include a substrate. The substrate has the function of supporting the adhesive layer in the adhesive tape. Examples of the substrate that can be used include a resin film, a foam, a woven fabric, a nonwoven fabric, metal foil, a glass sheet, paper, and a composite substrate having a configuration in which these are combined. The resin film is distinguished from the foam in that it is non-foamed. In particular, the proportion of the biomass-derived raw material in the substrate may be 50% or more by mass because the biobased content in the entire adhesive tape can be improved.

Examples of the resin film that can be used include sheets or films obtained using a polyester resin, such as polyethylene terephthalate, polyethylene naphthalate, or polybutylene terephthalate, a polyolefin resin, such as polyethylene or polypropylene, a polyacrylic resin, a polyvinyl chloride resin, a polypropylene ethylene vinyl alcohol, a polyvinyl alcohol resin, a polyurethane resin, a polyamide resin, or a polyimide resin. The surface of the resin film may be subjected to, for example, antistatic treatment or corona treatment.

Examples of the foam that can be used include polyolefin foams, polyurethane foams, acrylic foams, other rubber foams. The surface of the foam substrate may be subjected to, for example, antistatic treatment or corona treatment.

Examples of the woven fabric or nonwoven fabric include woven fabrics or nonwoven fabrics obtained using Manila hemp, wood pulp, chemical fibers, such as rayon, acetate fibers, polyester fibers, vinylon fibers (polyvinyl alcohol fibers), and polyamide fibers, and mixtures thereof.

Examples of the paper include Japanese paper, woodfree paper, craft paper, and crepe paper. Examples of the metal foil include aluminum foil and copper foil.

Examples of the composite substrate include a laminated sheet of the resin film and a metal layer, such as metal foil, a metal layer formed by sputtering, a metal layer formed by vapor deposition, or a layer of metal plating, or a metal oxide layer; and a resin sheet reinforced with inorganic fibers, such as glass cloth.

The substrate may further include an intermediate layer, an undercoat layer, and other layers.

The thickness of the substrate can be appropriately selected in accordance with the material and the form thereof. For example, the thickness of the substrate may be 1,000 μm or less, about 1 μm to about 1,000 μm, about 2 μm to about 500 μm, about 3 μm to about 300 μm, or about 5 μm to about 250 μm.

Release Liner

The adhesive tape according to one or more embodiments of the present invention may include a release liner on the surface of the adhesive layer. The use of the release liner can protect and preserve the surface of the adhesive layer until the time of use of the adhesive tape, and is useful in terms of workability, etc.

The release liner is not limited to a particular release liner. A publicly known release liner can be used as appropriate. For example, it is possible to use a release liner in which at least one surface of a substrate for the release liner is coated with a release agent (parting agent), such as a silicone-based release agent, a fluorine-based release agent, a long-chain alkyl-based release agent, or a fatty acid amide-based release agent. The substrate for the release liner may have a single-layer structure or a multilayer structure.

As the substrate for the release liner, various thin sheets, such as a plastic film, paper, a foam, and metal foil, can be used, and a plastic film is particularly preferred. Examples of the raw material of the plastic film include polyesters, such as polyethylene terephthalate, polyolefins, such as polypropylene and ethylene-propylene copolymers, and thermoplastic resins, such as polyvinyl chloride. A plastic film made of polylactic acid, polyester, or polyamide obtained from a biomass-derived raw material, or paper can be suitably used.

The release liner may be disposed on at least one adhesive surface of the adhesive tape, and may be disposed on both adhesive surfaces of the adhesive tape.

Other Configurations

The adhesive tape according to one or more embodiments of the present invention may include any layer in accordance with the use and so forth.

3. Other Properties of Adhesive Tape

The adhesive tape according to one or more embodiments of the present invention may be what is called a substrate-less adhesive tape in which each of the opposing main surfaces of the adhesive layer serves as an adhesive surface of the adhesive tape, or may be a single-sided adhesive tape or a double-sided adhesive tape in which an adhesive layer is disposed on one side or each side of a substrate directly or with another layer provided therebetween. In the case of a double-sided adhesive tape including a substrate, an adhesive layer disposed on at least one side of the substrate may be the adhesive layer described in the section of "1. Adhesive Layer" above. More preferably, an adhesive layer disposed on each side of the substrate is the adhesive layer described in the section of "1. Adhesive Layer" above from the viewpoint of increasing the biobased content of the entire adhesive tape. When the adhesive tape according to one or more embodiments of the present invention includes a substrate, the adhesive layer described in the section "1. Adhesive Layer" may serve as an adhesive surface of the adhesive tape.

The form of the adhesive tape according to one or more embodiments of the present invention is not limited to a particular form, and may be a roll form or a single-sheet form. In addition, the total thickness of the adhesive tape according to one or more embodiments of the present invention is not limited to a particular thickness, and can be appropriately set according to the application and so forth.

The adhesive tape according to one or more embodiments of the present invention may have a 180° peel adhesion strength to a stainless steel sheet of 3 N/20 mm or more, 5 N/20 mm or more, or 8 N/20 mm or more, from the viewpoint of exhibiting high adhesion strength even at a high biobased content.

The 180° peel adhesion strength of the adhesive tape according to one or more embodiments of the present invention to a stainless steel plate can be measured by the following method. One side of the adhesive tape is lined with a polyethylene terephthalate film having a thickness of 25 μm. The tape is cut into a test piece having a width of 20 mm. The resulting test piece is attached to a clean and smooth surface of a stainless steel sheet in such a manner that the adhesion area is 20 mm×60 mm. The test piece is press-bonded by reciprocating a 2-kg roller once on the upper surface and then reciprocating the 2-kg roller once. After pressing, the test piece is allowed to stand for 1 hour under conditions of 23° C. and 50% RH in accordance with JIS Z 0237. Thereafter, the test piece is peeled off in an atmosphere of 23° C. and 50% RH with a tensile tester under conditions of a peeling direction of 180° and a tension speed of 0.3 m/min. In this way, the 180° peel adhesion strength of the adhesive tape to the stainless steel (SUS) sheet can be measured.

4. Method for Producing Adhesive Tape

A method for producing the adhesive tape according to one or more embodiments of the present invention is not limited to a particular method. A known method can be appropriately employed in accordance with the configuration of the adhesive tape. An example of a method for producing a substrate-less adhesive tape is a method in which the above-described adhesive composition is applied onto a release liner, dried, and cured to form an adhesive layer, and if necessary, a release liner is bonded to the exposed main surface of the adhesive layer. Examples of a method for producing an adhesive tape including a substrate include a production method (direct method) in which the above-described adhesive composition is applied to one or both of the surfaces of a substrate and dried or the like; and a production method (transfer method) in which the adhesive composition is applied to a surface of a release liner and dried or the like to form an adhesive layer, and then the resulting adhesive layer is transferred to one or both of the surfaces of a substrate.

In the production of the adhesive tape, the adhesive composition may be mixed with a known solvent, if necessary, and used as a solution of the adhesive composition. An example of the method for applying the adhesive composition is an application method using a roll coater, a gravure coater, a reverse coater, a spray coater, an air knife coater, a die coater, or the like.

An example of the method for drying the adhesive composition after application is a method in which drying is performed at 50° C. to 140° C. for 30 seconds to 10 minutes. After the drying, aging may be further performed at a temperature in the range of 30° C. to 50° C. from the viewpoint of promoting the curing reaction.

5. Application

The adhesive tape according to one or more embodiments of the present invention can achieve both a high biobased content and high adhesion strength. In particular, the adhesive tape is useful as an adhesive tape used, for example, in electronic devices, such as portable electronic terminals, cameras, and personal computers, or in production processes thereof, for fixing protective panels of image display units to housings, or for fixing exterior components, and rigid components, such as batteries.

One or more embodiments of the present invention are not limited to the above one or more embodiments. The above-described one or more embodiments are merely examples, and those having substantially the same configuration and exhibiting the same functions and effects as the technical idea disclosed in the claims of one or more embodiments of the present invention are included in the technical scope of one or more embodiments of the present invention.

EXAMPLES

Hereinafter, one or more embodiments of the present invention will be more specifically described with reference to Examples, which however are not intended to limit the invention.

The number-average molecular weight and the weight-average molecular weight of a urethane resin were measured by the following gel permeation chromatography (GPC) measurement method.

GPC Measurement Method

Measurement device: High-performance GPC system ("HLC-8220GPC", available from Tosoh Corporation)

Column: The following columns, available from Tosoh Corporation, were connected in series and used.
(1) TSK-GEL HXL-H (guard column)
(2) TSK-GEL GMHXL
(3) TSK-GEL GMHXL
(4) TSK-GEL GMHXL
(5) TSK-GEL GMHXL Sample concentration: 4 mg/mL (diluted with tetrahydrofuran)

Mobile phase solvent: Tetrahydrofuran

Flow rate: 1.0 mL/min

Injection volume: 100 μL

Column temperature: 40° C.

Reference material: A calibration curve was created using the following standard polystyrene.

Standard Polystyrene

Tosoh Corporation "TSKgel Standard Polystyrene A-500"
Tosoh Corporation "TSKgel Standard Polystyrene A-1000"
Tosoh Corporation "TSKgel Standard Polystyrene A-2500"
Tosoh Corporation "TSKgel Standard Polystyrene A-5000"
Tosoh Corporation "TSKgel Standard Polystyrene F-1"
Tosoh Corporation "TSKgel Standard Polystyrene F-2"
Tosoh Corporation "TSKgel Standard Polystyrene F-4"
Tosoh Corporation "TSKgel Standard Polystyrene F-10"
Tosoh Corporation "TSKgel Standard Polystyrene F-20"
Tosoh Corporation "TSKgel Standard Polystyrene F-40"
Tosoh Corporation "TSKgel Standard Polystyrene F-80"
Tosoh Corporation "TSKgel Standard Polystyrene F-128"
Tosoh Corporation "TSKgel Standard Polystyrene F-288"
Tosoh Corporation "TSKgel Standard Polystyrene F-550"
Tosoh Corporation "TSKgel Standard Polystyrene F-850"

Example 1

Into a reaction vessel equipped with a stirrer, a reflux condenser, a nitrogen inlet, and a thermometer, 847 parts by mass of biomass poly(1,3-propanediol) ("PPD-1") as a linear biobased polyether polyol (a1-1), 20 parts by mass of polypropylene glycol glyceryl ether ("Uniol TG-330", available from NOF Corporation, a trifunctional polyol, number-average molecular weight: 330) as a polyfunctional polyol (a1-2), 133 parts by mass of tolylene diisocyanate (TDI) as a polyisocyanate (a2), and 428 parts by mass of methyl ethyl ketone (MEK) were placed. After the temperature inside the reaction vessel was increased to 40° C., 0.2 parts by mass of stannous octoate ("Neostann U-28", available from Nitto Kasei Co., Ltd.) was added. The temperature was increased to 75° C. over 1 hour and held at 75° C. for 12 hours. After the disappearance of all isocyanate groups was confirmed, the reaction was terminated by addition of 1.1 parts by mass of 1,3-butanediol (1,3-BG). The addition of 571 parts by mass of MEK resulted in an MEK solution (solid content: 50% by mass) of a urethane resin (A-1). The resulting urethane resin (A-1) had a number-average molecular weight of 4,300 and a weight-average molecular weight of 14,200.

Next, 2.7 parts by mass of the isocyanurate of hexamethylene diisocyanate (D-100K) as a cross-linking agent (B) and 0.02 parts by mass of dioctyltin dineodecanoate as a curing catalyst were added to 100 parts by mass of the urethane resin (A-1) to prepare an adhesive composition (1).

The adhesive composition (1) was applied to the heavy-release-treated surface of a release liner S1 (125-μm-thick release paper having both surfaces subjected to release treatment) and dried at 85° C. for 3 minutes. After drying the adhesive composition (1), the light-release-treated surface of another release liner S2 (125-μm-thick release paper having both surfaces subjected to release treatment) was bonded to the coating film. The coating film was cured at 40° C. for 48 hours to provide a substrate-less adhesive tape (1) having a thickness of 50 μm.

Examples 2 to 23 and Comparative Examples 1 to 12

MEK solutions (solid content: 50% by mass) of urethane resins (A-2) to (A-13) were prepared in the same manner as in Example 1, except that the compounds and their amounts used for the synthesis of the urethane resin (A-1) in Example 1 were changed to compounds and their amounts, given in Table 1. Adhesive compositions (2) to (35) were prepared in the same manner as in Example 1, except that the reaction was performed using a compound as the cross-linking agent (B) in an amount, given in Table 1, based on 100 parts by mass of the solid content of each of the urethane resins (A-2) to (A-13). Substrate-less adhesive tapes (2) to (35) having a thickness of 50 μm were produced in the same manner as in Example 1, except that the adhesive compositions (2) to (35) were used in place of the adhesive composition (1).

Evaluation 1: Biobased Content of Adhesive Layer

The mass fraction of the biomass-derived raw material contained in the adhesive composition based on the total mass of the adhesive composition contained in the adhesive layer of each of the adhesive tapes obtained in Examples and Comparative examples was calculated from the following computational expression:

Biobased content of adhesive layer (% by mass)=100×[mass (g) of biomass-derived raw material in adhesive composition constituting adhesive layer]/[total mass (g) of adhesive composition constituting adhesive layer] where each mass is expressed in terms of the nonvolatile content.

Evaluation 2: Gel Fraction of Adhesive Layer

Each of the adhesive compositions (solid content) used to form the adhesive layers of the adhesive tapes obtained in Examples and Comparative examples was applied onto a release liner to a dry thickness of 50 μm, dried at 100° C. for 3 minutes, aged at 40° C. for 2 days, and cut into a 50 mm×50 mm square, which was used as a sample. The mass (G1) of the sample before immersion in toluene was measured in advance. After the sample was immersed in a toluene solution at 23° C. for 24 hours, the toluene-insoluble content of the sample was separated by filtration through a 300-mesh wire screen. The mass of the residue (G2) after drying at 110° C. for 1 hour was measured. The gel fraction was calculated from the following equation.

Gel fraction (% by mass)=(G2/G1)×100

Evaluation 3: Stress at 100% Strain of Adhesive Layer on Stress-Strain Curve

The adhesive tapes obtained in each of Examples and Comparative examples were laminated until the total thickness of the laminated adhesive layer was about 400 μm, thereby forming a test piece having a width of 10 mm with reference lines marked at a distance of 20 mm from each other. This test piece was pulled with a tensile tester at a tension speed of 300 mm/min in a measurement environment at a temperature of 23° C. and a relative humidity of 50% to measure a stress-strain curve, what is called an S-S curve. The stress at 100% strain was determined from the curve.

Evaluation 4: 180° Peel Adhesion Strength to Stainless Steel (SUS) Sheet

The release liners S2 were peeled from the adhesive tapes obtained in Examples and Comparative examples. Then each adhesive tape was lined with a polyethylene terephthalate film having a thickness of 25 μm and cut into a width of 20 mm, thereby forming a test piece. The release liner S1 of the test piece was peeled off. The test piece was attached to a clean and smooth surface of a stainless steel sheet in such a manner that the adhesion area is 20 mm×60 mm. The test piece was press-bonded by reciprocating a 2-kg roller once on the upper surface and then reciprocating the 2-kg roller once. After pressing, the test piece was allowed to stand for 1 hour under conditions of 23° C. and 50% RH in accordance with JIS Z 0237. Thereafter, the test piece was peeled off in an atmosphere of 23° C. and 50% RH with a tensile tester to measure the 180° peel adhesion strength of the adhesive tape to the stainless steel (SUS) sheet (peeling direction: 180°, tension speed: 0.3 m/min).

Tables 1 to 3 present the compositions and evaluation results of the adhesive compositions (1) to (35) obtained above. In the tables, abbreviations represent the following compounds.

Polyether Polyol

"PPD-1": Biobased poly(1,3-propanediol) (number-average molecular weight: 1,000, hydroxyl value: 105.2 mgKOH/g)

"PPD-2": Biobased poly(1,3-propanediol) (number-average molecular weight: 2,000, hydroxyl value: 55.1 mgKOH/g)

Polyfunctional Polyol

"TG-330": Polypropylene glycol glyceryl ether ("Uniol TG-330", available from NOF Corporation, number-average molecular weight: 330, hydroxyl value: 502 mgKOH/g)

"TMP": Trimethylolpropane Polyisocyanate

"HDI": Hexamethylene diisocyanate "TDI": Tolylene diisocyanate "MDI": 4,4'-Diphenylmethane diisocyanate "T1890/100": Isocyanurate form of isophorone diisocyanate, NCO-functionality: 3 or more ("Vestanat T1890/100", available from Evonik, NCO %: 17.1% by mass)

Chain Extender

"14BG": 1,4-Butylene glycol

Cross-Linking Agent

"D-100K": Isocyanurate form of hexamethylene diisocyanate ("Finetack Hardener D-100K", available from DIC Corporation, NCO %: 21.8% by mass)

"D-40": Adduct form of tolylene diisocyanate ("Burnock D-40", available from DIC Corporation, NCO %: 7.1% by mass)

TABLE 1

|  |  |  |  | Example 1 | Example 2 | Example 3 | Example 4 | Example 5 | Example 6 |
|---|---|---|---|---|---|---|---|---|---|
|  | Adhesive tape |  |  | (1) | (2) | (3) | (4) | (5) | (6) |
|  | Adhesive composition |  |  | (1) | (2) | (3) | (4) | (5) | (6) |
|  |  |  |  | A-1 | A-2 | A-2 | A-2 | A-3 | A-3 |
| Urethane resin (A) | Polyether polyol | (a1-1) | PPD-1 | 84.7 | 83.0 | 83.0 | 83.0 | 78.1 | 78.1 |
|  |  |  | PPD-2 | — | — | — | — | — | — |
|  | Polyfunctional polyol | (a1-2) | TG-330 | 2.0 | 2.0 | 2.0 | 2.0 | 2.0 | 2.0 |
|  |  |  | TMP | — | — | — | — | — | — |
|  | Polyisocyanate | (a2-1) | TDI | 13.3 | 14.7 | 14.7 | 14.7 | — | — |
|  |  |  | HDI | — | — | — | — | — | — |
|  |  |  | MDI | — | — | — | — | 19.9 | 19.9 |
|  |  |  | T1890/100 | — | — | — | — | — | — |
|  | Chain extender | (a3) | 14BG | — | — | — | — | — | — |
|  | Urethanization catalyst |  | Stannous octoate | 0.02 | 0.02 | 0.02 | 0.02 | 0.02 | 0.02 |
|  | Number-average molecular weight (Mn) |  |  | 4300 | 4800 | 4800 | 4800 | 5100 | 5100 |
|  | Weight-average molecular weight (Mw) |  |  | 14200 | 81500 | 81500 | 81500 | 26600 | 26600 |
| Cross-linking agent (B) | Polyisocyanate |  | D-40 | — | — | — | 2.2 | — | — |
|  |  |  | D-100K | 2.7 | 0.6 | 0.9 | — | 0.6 | 1.2 |
| Curing catalyst |  |  | Dioctyldineodecanoatetin | 0.02 | 0.02 | 0.02 | 0.02 | 0.02 | 0.02 |
| Evaluation | Biobased content [%] |  |  | 82 | 83 | 83 | 82 | 78 | 77 |
|  | 180° Peel adhesion strength [N/20 mm] |  |  | 7.9 | 8.0 | 6.3 | 9.7 | 5.8 | 9.7 |
|  | Gel fraction [%] |  |  | 36 | 15 | 39 | 47 | 29 | 47 |
|  | Stress at 100% strain of adhesive layer in stress-strain curve [N/cm$^2$] |  |  | 7 | 5 | 8 | 15 | 11 | 16 |

|  |  |  |  | Example 7 | Example 8 | Example 9 | Example 10 | Example 11 | Example 12 |
|---|---|---|---|---|---|---|---|---|---|
|  | Adhesive tape |  |  | (7) | (8) | (9) | (10) | (11) | (12) |
|  | Adhesive composition |  |  | (7) | (8) | (9) | (10) | (11) | (12) |
|  |  |  |  | A-3 | A-3 | A-4 | A-4 | A-4 | A-4 |
| Urethane resin (A) | Polyether polyol | (a1-1) | PPD-1 | 78.1 | 78.1 | — | — | — | — |
|  |  |  | PPD-2 | — | — | 89.6 | 89.6 | 89.6 | 89.6 |
|  | Polyfunctional polyol | (a1-2) | TG-330 | 2.0 | 2.0 | 2.0 | 2.0 | 2.0 | 2.0 |
|  |  |  | TMP | — | — | — | — | — | — |
|  | Polyisocyanate | (a2-1) | TDI | — | — | 8.5 | 8.5 | 8.5 | 8.5 |
|  |  |  | HDI | — | — | — | — | — | — |
|  |  |  | MDI | 19.9 | 19.9 | — | — | — | — |
|  |  |  | T1890/100 | — | — | — | — | — | — |
|  | Chain extender | (a3) | 14BG | — | — | — | — | — | — |
|  | Urethanization catalyst |  | Stannous octoate | 0.02 | 0.02 | 0.02 | 0.02 | 0.02 | 0.02 |
|  | Number-average molecular weight (Mn) |  |  | 5100 | 5100 | 8600 | 8600 | 8600 | 8600 |
|  | Weight-average molecular weight (Mw) |  |  | 26600 | 26600 | 63000 | 63000 | 63000 | 63000 |
| Cross-linking agent (B) | Polyisocyanate |  | D-40 | 1.4 | 3.5 | — | — | 2.1 | 3.2 |
|  |  |  | D-100K | — | — | 0.9 | 1.7 | — | — |
| Curing catalyst |  |  | Dioctyldineodecanoatetin | 0.02 | 0.02 | 0.02 | 0.02 | 0.02 | 0.02 |
| Evaluation | Biobased content [%] |  |  | 77 | 75 | 89 | 88 | 88 | 87 |
|  | 180° Peel adhesion strength [N/20 mm] |  |  | 14.0 | 10.3 | 8.1 | 7.9 | 7.1 | 5.7 |
|  | Gel fraction [%] |  |  | 33 | 66 | 34 | 66 | 55 | 77 |
|  | Stress at 100% strain of adhesive layer in stress-strain curve [N/cm$^2$] |  |  | 13 | 33 | 8 | 25 | 20 | 47 |

TABLE 2

|  |  |  |  | Example 13 | Example 14 | Example 15 | Example 16 | Example 17 | Example 18 |
|---|---|---|---|---|---|---|---|---|---|
|  | Adhesive tape |  |  | (13) | (14) | (15) | (16) | (17) | (18) |
|  | Adhesive composition |  |  | (13) | (14) | (15) | (16) | (17) | (18) |
|  |  |  |  | A-5 | A-5 | A-5 | A-6 | A-6 | A-6 |
| Urethane resin (A) | Polyether polyol | (a1-1) | PPD-1 | 82.4 | 82.4 | 82.4 | 84.7 | 84.7 | 84.7 |
|  |  |  | PPD-2 | — | — | — | — | — | — |
|  | Polyfunctional polyol | (a1-2) | TG-330 | 2.0 | 2.0 | 2.0 | — | — | — |
|  |  |  | TMP | — | — | — | 0.8 | 0.8 | 0.8 |
|  | Polyisocyanate | (a2-1) | TDI | 15.3 | 15.3 | 15.3 | 14.5 | 14.5 | 14.5 |
|  |  |  | HDI | — | — | — | — | — | — |
|  |  |  | MDI | — | — | — | — | — | — |
|  |  |  | T1890/100 | — | — | — | — | — | — |

TABLE 2-continued

|  |  |  |  |  |  |  |  |  |
|---|---|---|---|---|---|---|---|---|
|  | Chain extender | (a3) | 14BG | 0.4 | 0.4 | 0.4 | — | — | — |
|  | Urethanization catalyst |  | Stannous octoate | 0.02 | 0.02 | 0.02 | 0.02 | 0.02 | 0.02 |
|  | Number-average molecular weight (Mn) |  |  | 7300 | 7300 | 7300 | 7000 | 7000 | 7000 |
|  | Weight-average molecular weight (Mw) |  |  | 55600 | 55600 | 55600 | 96500 | 96500 | 96500 |
| Cross-linking agent (B) | Polyisocyanate |  | D-40 | — | — | 3.2 | — | — | 1.3 |
|  |  |  | D-100K | 0.7 | 2.2 | — | 0.3 | 0.4 | — |
| Curing catalyst | Dioctyldineodecanoatetin |  |  | 0.02 | 0.02 | 0.02 | 0.02 | 0.02 | 0.02 |
| Evaluation | Biobased content [%] |  |  | 82 | 81 | 80 | 84 | 84 | 84 |
|  | 180° Peel adhesion strength [N/20 mm] |  |  | 11.1 | 5.6 | 7.6 | 11.6 | 8.6 | 9.8 |
|  | Gel fraction [%] |  |  | 35 | 73 | 72 | 24 | 42 | 29 |
|  | Stress at 100% strain of adhesive layer in stress-strain curve [N/cm²] |  |  | 10 | 37 | 39 | 9 | 14 | 12 |

|  |  |  |  | Example 19 | Example 20 | Example 21 | Example 22 | Example 23 |
|---|---|---|---|---|---|---|---|---|
|  | Adhesive tape |  |  | (19) | (20) | (21) | (22) | (23) |
|  | Adhesive composition |  |  | (19) A-6 | (20) A-7 | (21) A-7 | (22) A-7 | (23) A-7 |
| Urethane resin (A) | Polyether polyol | (a1-1) | PPD-1 | 84.7 | 84.4 | 84.4 | 84.4 | 84.4 |
|  |  |  | PPD-2 | — | — | — | — | — |
|  | Polyfunctional polyol | (a1-2) | TG-330 | — | — | — | — | — |
|  |  |  | TMP | 0.8 | — | — | — | — |
|  | Polyisocyanate | (a2-1) | TDI | 14.5 | 11.6 | 11.6 | 11.6 | 11.6 |
|  |  |  | HDI | — | — | — | — | — |
|  |  |  | MDI | — | — | — | — | — |
|  |  |  | T1890/100 | — | 4.0 | 4.0 | 4.0 | 4.0 |
|  | Chain extender | (a3) | 14BG | — | — | — | — | — |
|  | Urethanization catalyst |  | Stannous octoate | 0.02 | 0.02 | 0.02 | 0.02 | 0.02 |
|  | Number-average molecular weight (Mn) |  |  | 7000 | 5400 | 5400 | 5400 | 5400 |
|  | Weight-average molecular weight (Mw) |  |  | 96500 | 149600 | 149600 | 149600 | 149600 |
| Cross-linking agent (B) | Polyisocyanate |  | D-40 | 2.3 | — | — | 0.9 | 2.3 |
|  |  |  | D-100K | — | 0.2 | 0.4 | — | — |
| Curing catalyst | Dioctyldineodecanoatetin |  |  | 0.02 | 0.02 | 0.02 | 0.02 | 0.02 |
| Evaluation | Biobased content [%] |  |  | 83 | 84 | 84 | 84 | 83 |
|  | 180° Peel adhesion strength [N/20 mm] |  |  | 7.5 | 9.2 | 7.2 | 9.0 | 8.3 |
|  | Gel fraction [%] |  |  | 69 | 15 | 41 | 25 | 64 |
|  | Stress at 100% strain of adhesive layer in stress-strain curve [N/cm²] |  |  | 34 | 3 | 7 | 4 | 21 |

TABLE 3

|  |  |  |  | Comparative example 1 | Comparative example 2 | Comparative example 3 | Comparative example 4 | Comparative example 5 | Comparative example 6 |
|---|---|---|---|---|---|---|---|---|---|
|  | Adhesive tape |  |  | (24) | (25) | (26) | (27) | (28) | (29) |
|  | Adhesive composition |  |  | (24) A-8 | (25) A-8 | (26) A-9 | (27) A-9 | (28) A-9 | (29) A-10 |
| Urethane resin (A) | Polyether polyol | (a1-1) | PPD-1 | 87.0 | 87.0 | 85.4 | 85.4 | 85.4 | 83.1 |
|  |  |  | PPD-2 | — | — | — | — | — | — |
|  | Polyfunctional polyol | (a1-2) | TG-330 | — | — | 1.9 | 1.9 | 1.9 | 4.0 |
|  | Polyisocyanate | (a2) | TDI | — | — | — | — | — | — |
|  |  |  | HDI | 13.0 | 13.0 | 12.7 | 12.7 | 12.7 | 12.9 |
|  | Urethanization catalyst |  | Stannous octoate | 0.02 | 0.02 | 0.02 | 0.02 | 0.02 | 0.02 |
|  | Number-average molecular weight (Mn) |  |  | 13000 | 13000 | 3900 | 3900 | 3900 | 3500 |
|  | Weight-average molecular weight (Mw) |  |  | 36000 | 36000 | 15300 | 15300 | 15300 | 16300 |
| Cross-linking agent (B) | Polyisocyanate |  | D-100K | 1.6 | 4.9 | 2.7 | 5.3 | 8.0 | 3.9 |
| Curing catalyst | Dioctyldineodecanoatetin |  |  | 0.02 | 0.02 | 0.02 | 0.02 | 0.02 | 0.02 |
| Evaluation | Biobased content [%] |  |  | 86 | 83 | 83 | 81 | 79 | 80 |
|  | 180° Peel adhesion strength [N/20 mm] |  |  | 0 | 0 | 1.2 | 0 | 0 | 2.0 |

TABLE 3-continued

|  |  |  |  |  |  |  |  |  |
|---|---|---|---|---|---|---|---|---|
|  | Gel fraction [%] |  |  | 0 | 83 | 17 | 76 | 94 | 58 |
|  | Stress at 100% strain of adhesive layer in stress-strain curve [N/cm$^2$] |  |  | 5 | 60 | <5 | 35 | 90 | 10 |

|  |  |  |  | Comparative example 7 | Comparative example 8 | Comparative example 9 | Comparative example 10 | Comparative example 11 | Comparative example 12 |
|---|---|---|---|---|---|---|---|---|---|
|  | Adhesive tape |  |  | (30) | (31) | (32) | (33) | (34) | (35) |
|  | Adhesive composition |  |  | (30) | (31) | (32) | (33) | (34) | (35) |
|  |  |  |  | A-10 | A-10 | A-11 | A-11 | A-12 | A-13 |
| Urethane resin (A) | Polyether polyol | (a1-1) | PPD-1 | 83.1 | 83.1 | 84.7 | 84.7 | 82.5 | — |
|  |  |  | PPD-2 | — | — | — | — | — | 87.0 |
|  | Polyfunctional polyol | (a1-2) | TG-330 | 4.0 | 4.0 | 2.0 | 2.0 | 4.0 | 4.0 |
|  | Polyisocyanate | (a2) | TDI | — | — | 13.3 | 13.3 | 13.5 | 9.0 |
|  |  |  | HDI | 12.9 | 12.9 | — | — | — | — |
|  | Urethanization catalyst | Stannous octoate |  | 0.02 | 0.02 | 0.02 | 0.02 | 0.02 | 0.02 |
|  | Number-average molecular weight (Mn) |  |  | 3500 | 3500 | 4300 | 4300 | 3900 | 7000 |
|  | Weight-average molecular weight (Mw) |  |  | 16300 | 16300 | 14200 | 14200 | 12700 | 142300 |
| Cross-linking agent (B) | Polyisocyanate | D-100K |  | 7.7 | 11.5 | 5.4 | 8.1 | 7.7 | 3.6 |
| Curing catalyst | Dioctyldineodecanoatetin |  |  | 0.02 | 0.02 | 0.02 | 0.02 | 0.02 | 0.02 |
| Evaluation | Biobased content [%] |  |  | 77 | 75 | 80 | 78 | 77 | 87 |
|  | 180° Peel adhesion strength [N/20 mm] |  |  | 0 | 0 | 1.6 | 0.1 | 0.3 | 0.3 |
|  | Gel fraction [%] |  |  | 87 | 96 | 86 | 93 | 91 | 89 |
|  | Stress at 100% strain of adhesive layer in stress-strain curve [N/cm$^2$] |  |  | 70 | 100< | 50 | 100 | 100 | 70 |

The above evaluation results indicated the following: In each of the adhesive tapes of Examples, the adhesive layer was composed of the reaction product of the urethane resin (A) containing at least the structural unit derived from the biobased polyether polyol and the structural unit derived from the aromatic polyisocyanate, and the cross-linking agent (B), and the adhesive layer had specific physical properties; hence, both a high biobased content and high adhesion strength were able to be achieved.

In contrast, in each of the adhesive tapes of Comparative examples, when the urethane resin (A) did not contain the structural unit derived from the aromatic polyisocyanate, the adhesion strength was low even if the gel fraction and the stress at 100% strain of the adhesive layer in the stress-strain curve satisfied the conditions. Even when the urethane resin (A) contained the structural unit derived from the aromatic polyisocyanate, the adhesion strength was low unless the gel fraction and the stress at 100% strain of the adhesive layer in the stress-strain curve satisfied the conditions.

Although the disclosure has been described with respect to only a limited number of embodiments, those skilled in the art, having benefit of this disclosure, will appreciate that various other embodiments may be devised without departing from the scope of the present disclosure. Accordingly, the scope of the invention should be limited only by the attached claims.

What is claimed is:

1. An adhesive tape, comprising an adhesive layer, wherein:
   the adhesive layer has a biobased content of 50% or more by mass,
   the adhesive layer contains a reaction product of an urethane resin (A) and a cross-linking agent (B),
   the urethane resin (A) contains at least a structural unit derived from a biobased polyether polyol and a structural unit derived from an aromatic polyisocyanate, and
   the adhesive layer has a gel fraction of 10% or more by mass and 80% or less by mass.

2. The adhesive tape according to claim 1, wherein the urethane resin (A) contains a structural unit derived from a linear biobased polyether diol.

3. The adhesive tape according to claim 1, wherein the urethane resin (A) further contains a structural unit derived from a tri- or higher-functional polyol.

4. The adhesive tape according to claim 1, wherein the urethane resin (A) has a weight-average molecular weight of 10,000 or more and 300,000 or less.

5. The adhesive tape according to claim 1, wherein the cross-linking agent (B) contains a tri- or higher-functional polyisocyanate compound.

6. The adhesive tape according to claim 1, wherein the adhesive tape has a 180° peel adhesion strength to a stainless steel sheet of 3 N/20 mm or more.

7. An adhesive tape, comprising an adhesive layer, wherein:
   the adhesive layer has a biobased content of 50% or more by mass,
   the adhesive layer contains a reaction product of an urethane resin (A) and a cross-linking agent (B),
   the urethane resin (A) contains at least a structural unit derived from a biobased polyether polyol and a structural unit derived from an aromatic polyisocyanate, and
   the adhesive layer has a stress of less than 50 N/cm$^2$ at 100% strain in a stress-strain curve.

8. The adhesive tape according to claim 7, wherein the urethane resin (A) contains a structural unit derived from a linear biobased polyether diol.

9. The adhesive tape according to claim 7, wherein the urethane resin (A) further contains a structural unit derived from a tri- or higher-functional polyol.

10. The adhesive tape according to claim 7, wherein the urethane resin (A) has a weight-average molecular weight of 10,000 or more and 300,000 or less.

11. The adhesive tape according to claim 7, wherein the cross-linking agent (B) contains a tri- or higher-functional polyisocyanate compound.

12. The adhesive tape according to claim 7, wherein the adhesive tape has a 180° peel adhesion strength to a stainless steel sheet of 3 N/20 mm or more.

* * * * *